(12) United States Patent
Dembowiak et al.

(10) Patent No.: US 6,425,560 B1
(45) Date of Patent: Jul. 30, 2002

(54) MAGNETIC MOUNTING OBJECT HOLDER AND HOOK

(76) Inventors: Casey M. Dembowiak, 2408 S. 62nd St., West Allis, WI (US) 53219; Edmund A. Malczewski, 2514A N. Weil St., Milwaukee, WI (US) 53212; Vicki L. Kempka, 3114 S. Brisbane Ave., Milwaukee, WI (US) 53207

( * ) Notice: Subject to any disclaimer, the term of this patent is extended or adjusted under 35 U.S.C. 154(b) by 0 days.

(21) Appl. No.: 09/652,207

(22) Filed: Aug. 31, 2000

(51) Int. Cl.⁷ .......................... A47G 1/17; A44B 21/00
(52) U.S. Cl. .................. 248/206.5; 248/205.2
(58) Field of Search .......... 248/309.4, 206.5, 248/205.2, 291.1, 304, 339, 558, 447, 455

(56) References Cited

U.S. PATENT DOCUMENTS

| | | | |
|---|---|---|---|
| 3,118,207 A | | 1/1964 | Breslow ................. 24/214 |
| 4,781,355 A | * | 11/1988 | Jeantin ................. 248/206.5 X |
| 5,141,196 A | * | 8/1992 | Arnold et al. ....... 248/205.2 X |
| 5,411,231 A | | 5/1995 | Buck ................. 248/206.5 |
| 5,778,824 A | * | 7/1998 | Musgrave et al. .......... 119/230 |
| D422,025 S | * | 3/2000 | Dembicks ............... D19/65 |
| 6,041,717 A | | 3/2000 | Kubat ................. 108/44 |
| 6,273,380 B1 | * | 8/2001 | Fillipp et al. ....... 248/231.31 X |

OTHER PUBLICATIONS

Assembly Instructions Concerning a "Universal Instru-Mount" (1) page, Shoberg Corp.
Assembly Instructions for "A Magnetic Instru-Mount" (1) page, Shoberg Corp.

* cited by examiner

Primary Examiner—Daniel P. Stodola
Assistant Examiner—Erica B. Harris
(74) Attorney, Agent, or Firm—Donald J. Ersler

(57) ABSTRACT

A magnetic mounting object holder includes a magnet, a base, a pivotal mounting plate, and a removable attachment surface. One end of the base is attached to a top of the magnet. The other end of the base is pivotally attached to the other end of the pivotal mounting plate. The removable attachment surface is attached to a top of the pivotal mounting plate. The magnetic hook includes a magnet, hook, and a fastener. The hook is attached to the magnet with the fastener. The hook preferably has two positions. In a first position, an item may be placed on or removed from the hook. In a second position, the magnet must be removed from a mounting surface to place or remove an item from the hook.

7 Claims, 8 Drawing Sheets

MAGNETIC MOUNTING OBJECT HOLDER AND HOOK

BACKGROUND OF THE INVENTION

1. Field of the Invention

The present invention relates generally to magnetic mounting retention devices and more specifically to a magnetic mounting object holder that allows an object to be held relative to a ferrous surface, and a magnetic hook mountable to a ferrous surface that is capable of holding or capturing an object.

2. Discussion of the Prior Art

There appears to be a lack of devices on the market that will magnetically attach to a ferrous surface, be pivotally adjustable, and retain an object such as a calculator, volt meter, or other device. However, there are some hooks that are attachable to a ferrous surface. U.S. Pat. No. 3,118,207 to Breslow, U.S. Pat. No. 5,411,231 to Buck, and U.S. Pat. No. 6,04,717 to Kubat all disclose hook type devices which are attachable to a ferrous surface. However, none of these devices feature a hook which may be reversed to hold or capture an object.

Accordingly, there is a clearly felt need in the art for a magnetic mounting object holder which allows an object to variably positioned relative to a ferrous surface, and a magnetic hook mountable to a ferrous surface, that is capable of holding or capturing an object.

SUMMARY OF THE INVENTION

The present invention provides a magnetic mounting object holder which allows an object to be retained by a ferrous surface, and a magnetic hook mountable to a ferrous surface that is capable of holding or capturing an object. The magnetic mounting object holder includes a magnet, a base, a pivotal mounting plate, and a removable attachment surface. One end of the base is attached to a top of the magnet. The other end of the base is pivotally attached to the other end of the pivotal mounting plate. The removable attachment surface is attached to a top of the pivotal mounting plate. The removable attachment surface is preferably one of a hook and loop fastener pad, commonly referred to as VELCRO. The force required to pivot the mounting base relative to pivotal mounting plate is preferably adjusted by tightening or loosening a threaded fastener.

The magnetic hook includes a magnet, hook, and a fastener. The hook is attached to the magnet with the fastener. The hook preferably has two different positions. In a first position, an item may be easily placed on or removed from the hook. In a second position, the magnet must be removed from a mounting surface to place or remove an item from the hook.

Accordingly, it is an object of the present invention to provide a magnetic mounting object holder that allows an object to be attached to a ferrous surface.

It is a further object of the present invention to provide a magnetic mounting object holder that allows an object to be rotated and pivoted to a desired position.

Finally, it is another object of the present invention to provide a magnetic hook that may be reversed to hold or capture an item placed thereupon.

These and additional objects, advantages, features and benefits of the present invention will become apparent from the following specification.

DETAILED DESCRIPTION OF THE PREFERRED EMBODIMENTS

Figure 1:
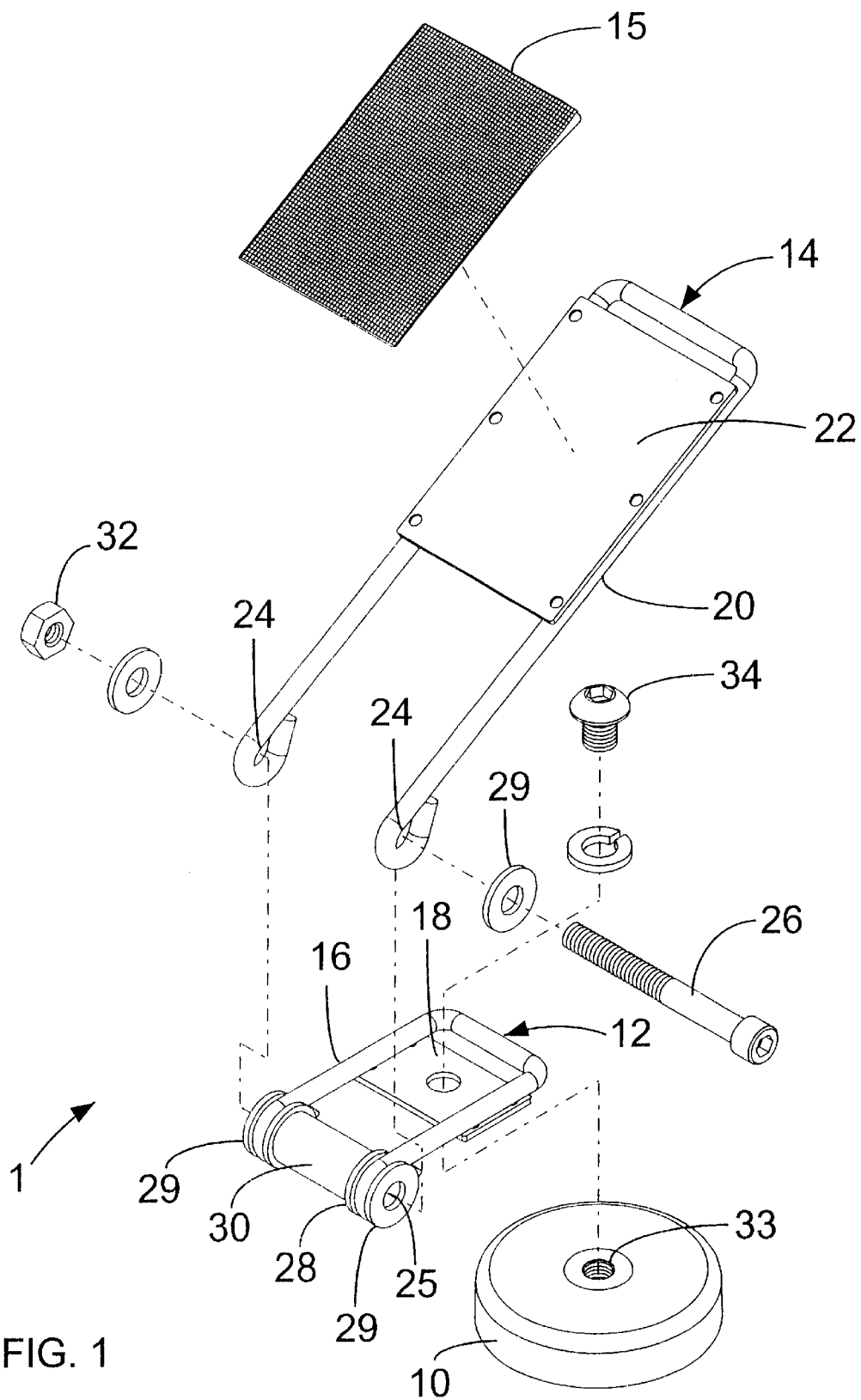
FIG. 1 is an exploded perspective view of a magnetic mounting object holder in accordance with the present invention.

With reference now to the drawings, and particularly to FIG. 1, there is shown an exploded perspective view of a magnetic mounting object holder 1. The magnetic mounting object holder 1 includes a magnet 10, a base 12, a pivotal mounting plate 14, and a removable mounting surface 15. The base 12 preferably includes a base frame 16 and a fastening plate 18. The fastening plate 18 is attached to a bottom of the base frame 16 at one end. The pivotal mounting plate 14 preferably includes a mounting frame 20 and a mounting plate 22. The mounting plate 22 is attached to a top of the mounting frame 20 at one end. A pair of openings 24 are formed on the other end of the base frame which are sized to slidably receive a fastener 26. A pair of openings 25 are formed on the other end of the base frame to which are sized to slidably receive a fastner 26.

Figure 3:
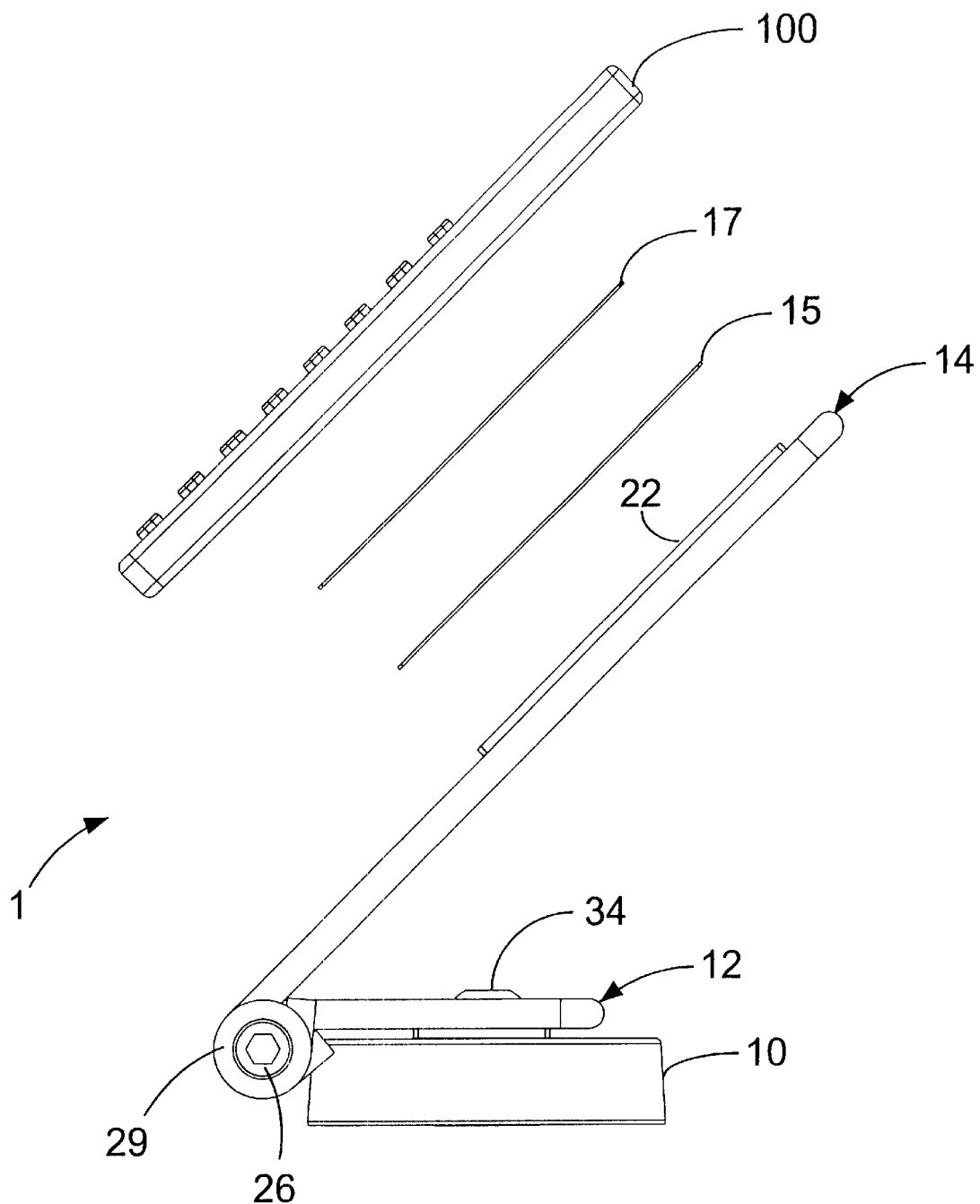
FIG. 3 is a partial exploded side view of a magnetic mounting object holder in accordance with the present invention.
Figure 4:
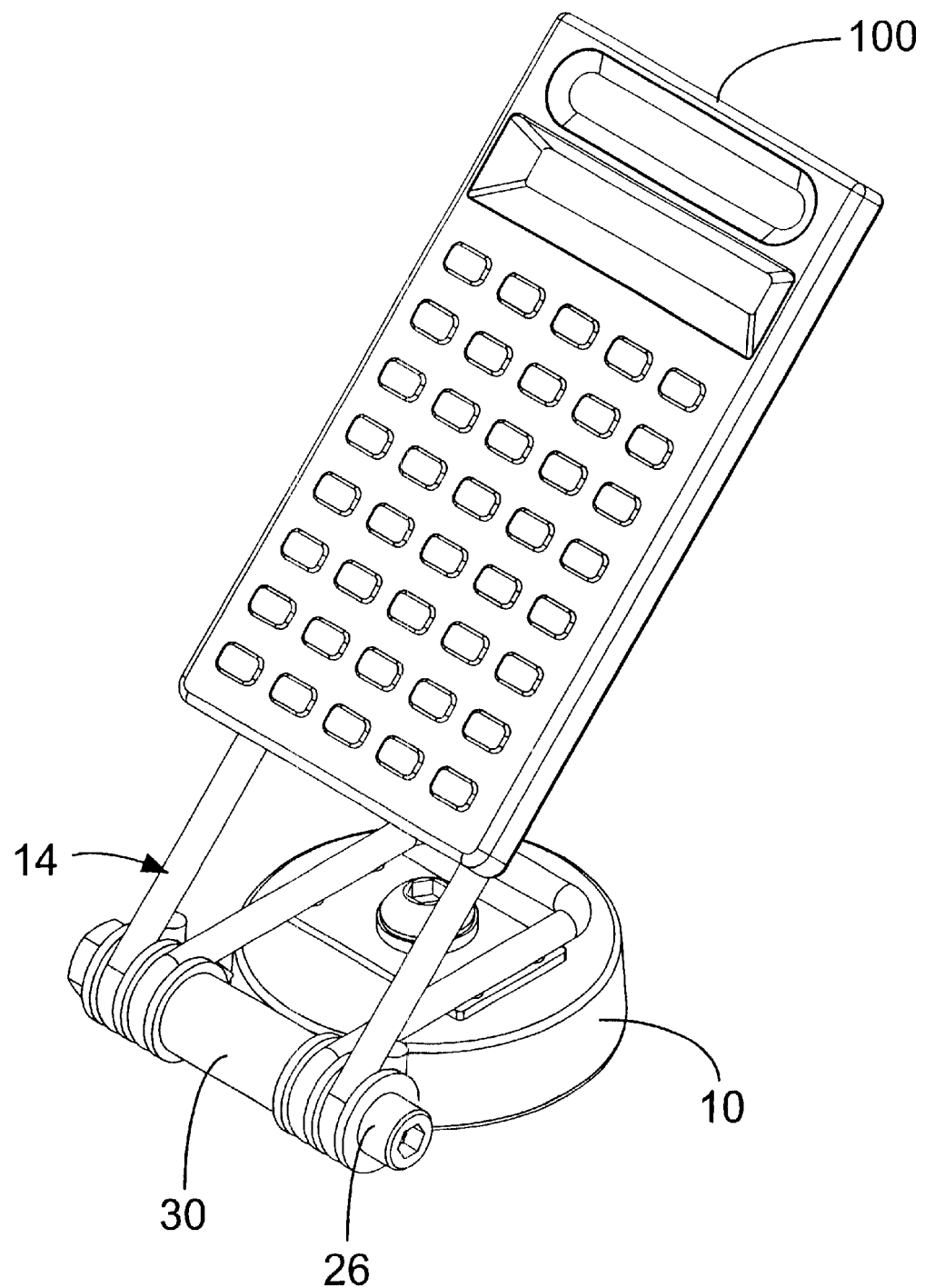
FIG. 4 is a perspective view of a calculator attached to a magnetic mounting object holder in accordance with the present invention.

The base and mounting frames are preferably fabricated from a bent rod and the base and mounting plates are preferably fabricated from sheet steel. The fastening plate 18 is preferably welded to the base frame 16 and the mounting plate 22 is preferably welded to the mounting frame 20. The base 12 and the pivotal mounting plate 14 could also be fabricated by plastic molding or metal stampings. The removable mounting surface 15 is preferably one of a hook and loop fastener, commonly referred to as VELCRO. With reference to FIG. 3, a second removable mounting surface 17 is preferably one of a loop and hook fastener. The removable mounting surface 15 is attached to the mounting plate 22 and the second removable mounting surface 17 is attached to an object 100. Other methods of removably attaching an object besides hook and loop fasteners may also be used. The object 100 shown in FIGS. 3 and 4 is a calculator, but could be a voltmeter or any other device.

Figure 2:
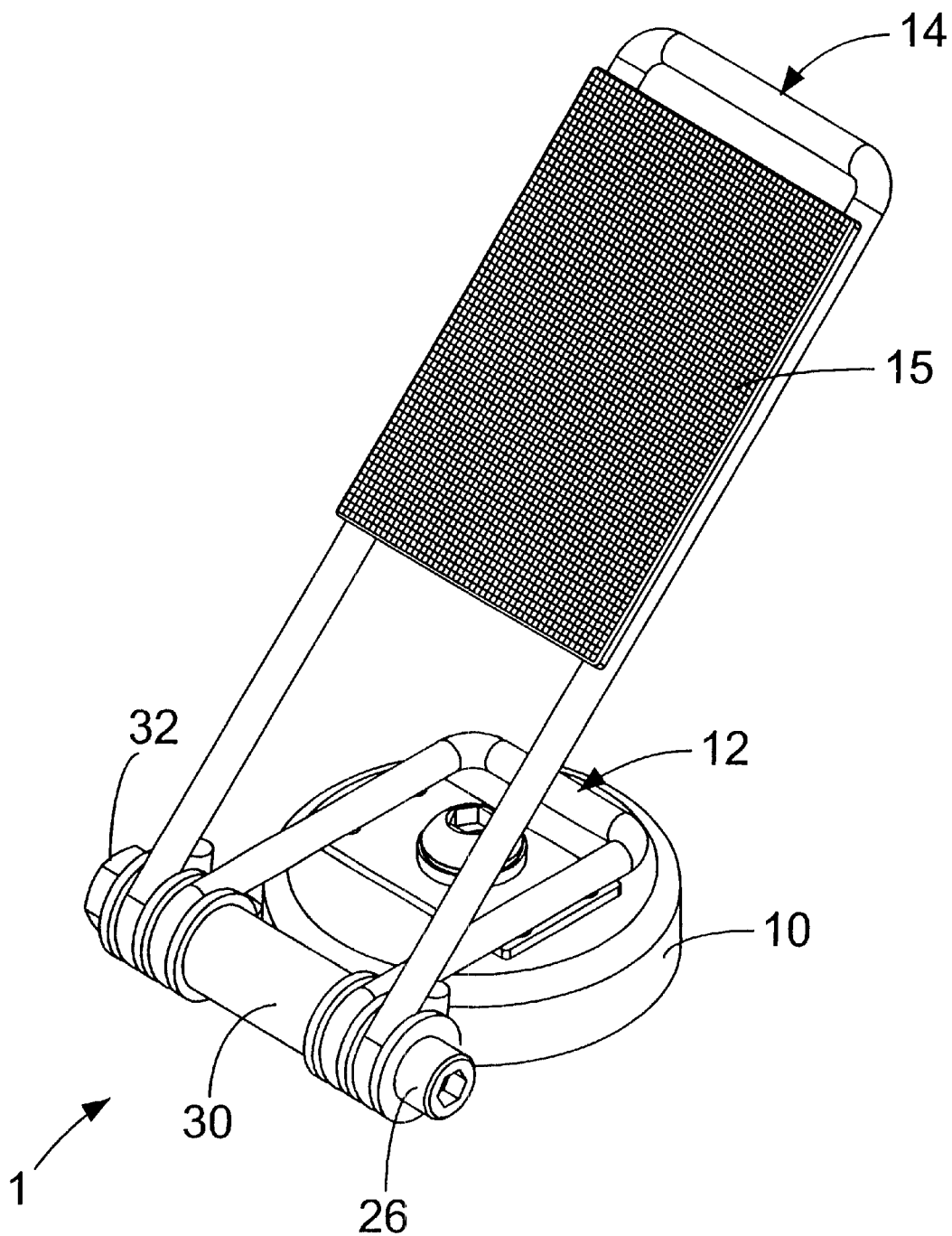
FIG. 2 is a perspective view of a magnetic mounting object holder in accordance with the present invention.

With reference to FIG. 2, the magnetic object mounting holder 1 is preferably assembled in the following way. A washer 28 is placed on both sides of a spacer tube 30. The washers 28 and spacer tube 30 are inserted into the base frame 16. A single friction washer 29 is placed on each side of the base frame 16 at the ends thereof. The friction washers 29 and the ends of the base frame 16 are placed between the ends of the mounting frame 20. A single friction washer 29 is preferably placed on each side of the mounting frame 20 at the other end thereof. The fastener 26 is inserted through the openings in the ends of the base and mounting frames and secured with a nut 32. The nut 32 may be tightened or loosened to adjust the force required to pivot the base 12 relative to the pivotal mounting plate 14. A tapped hole 33 is preferably formed in a top of the magnet 10 to threadably receive the fastener 26. However, the magnet 10 may be attached to the fastening plate 18 with an assembly method other than a fastener 34 such as adhesive.

Figure 5:
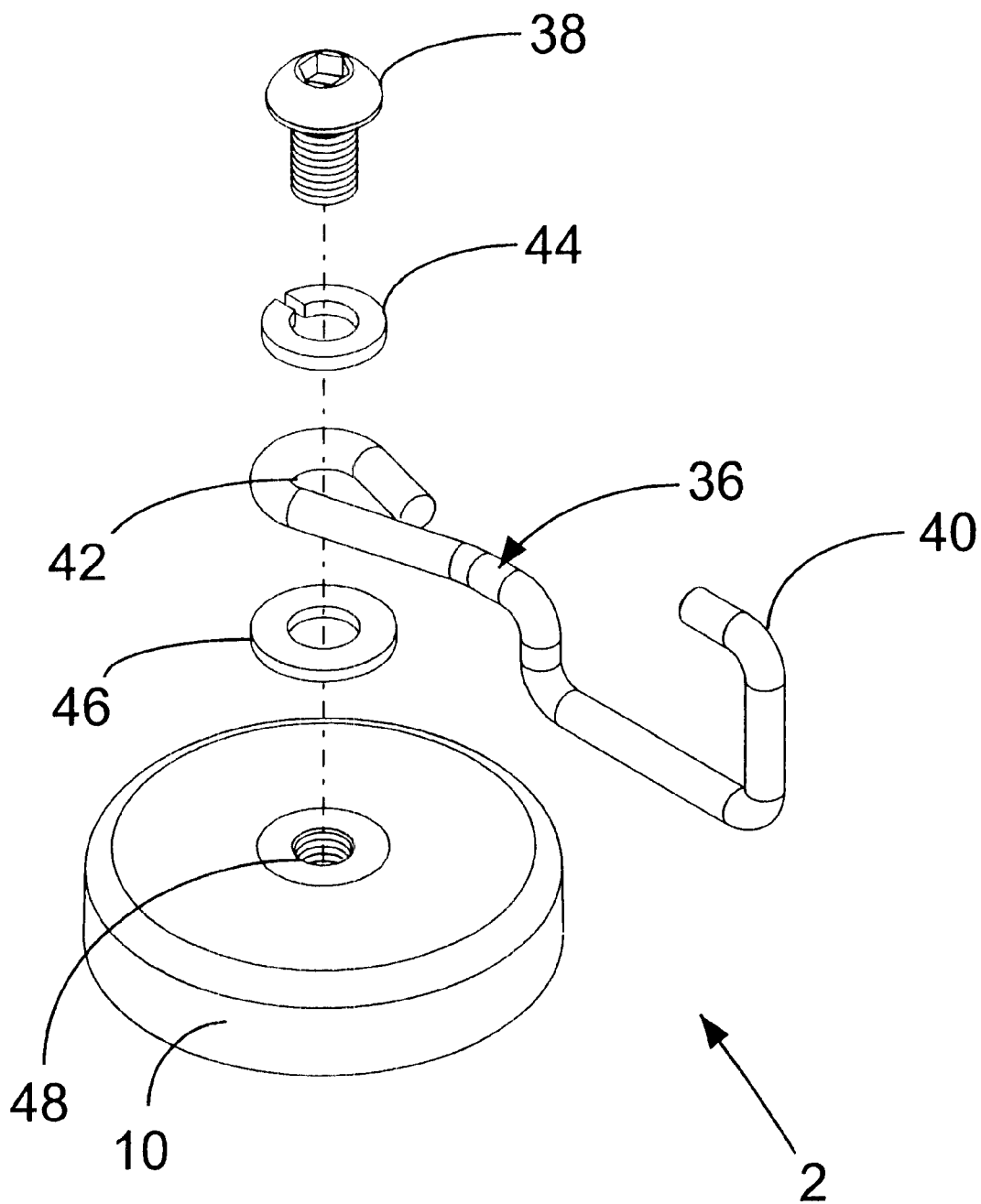
FIG. 5 is an exploded perspective view of a magnetic hook in accordance with the present invention.
Figure 6:
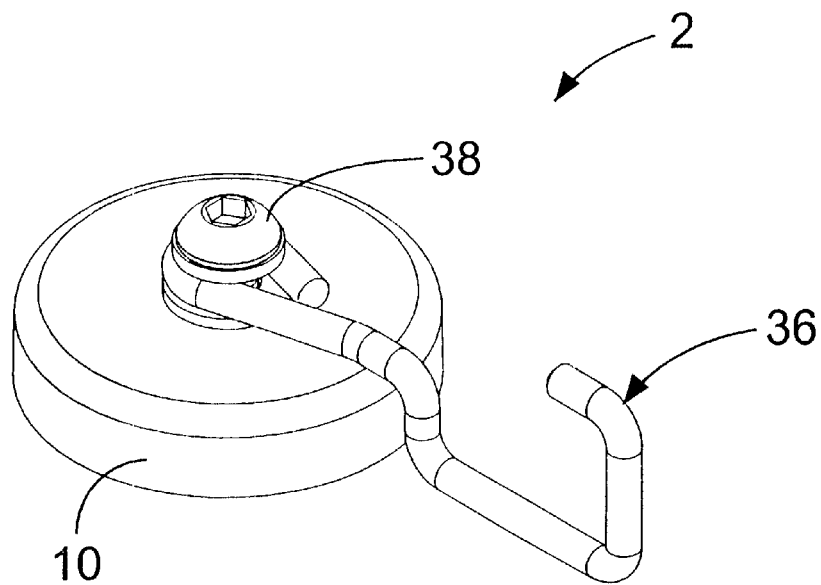
FIG. 6 is a perspective view of a magnetic hook with a hook in an open position in accordance with the present invention.
Figure 7:
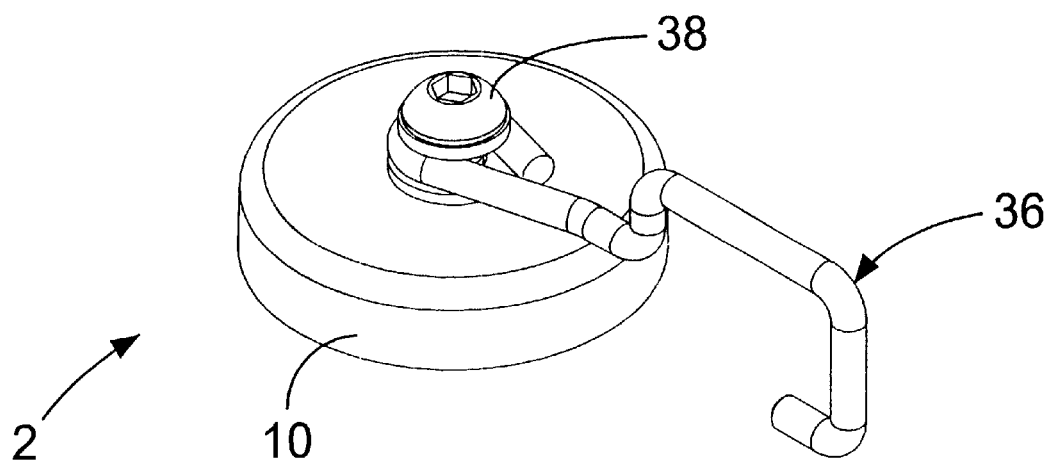
FIG. 7 is a perspective view of a magnetic hook with a hook in a closed position in accordance with the present invention.
Figure 8:
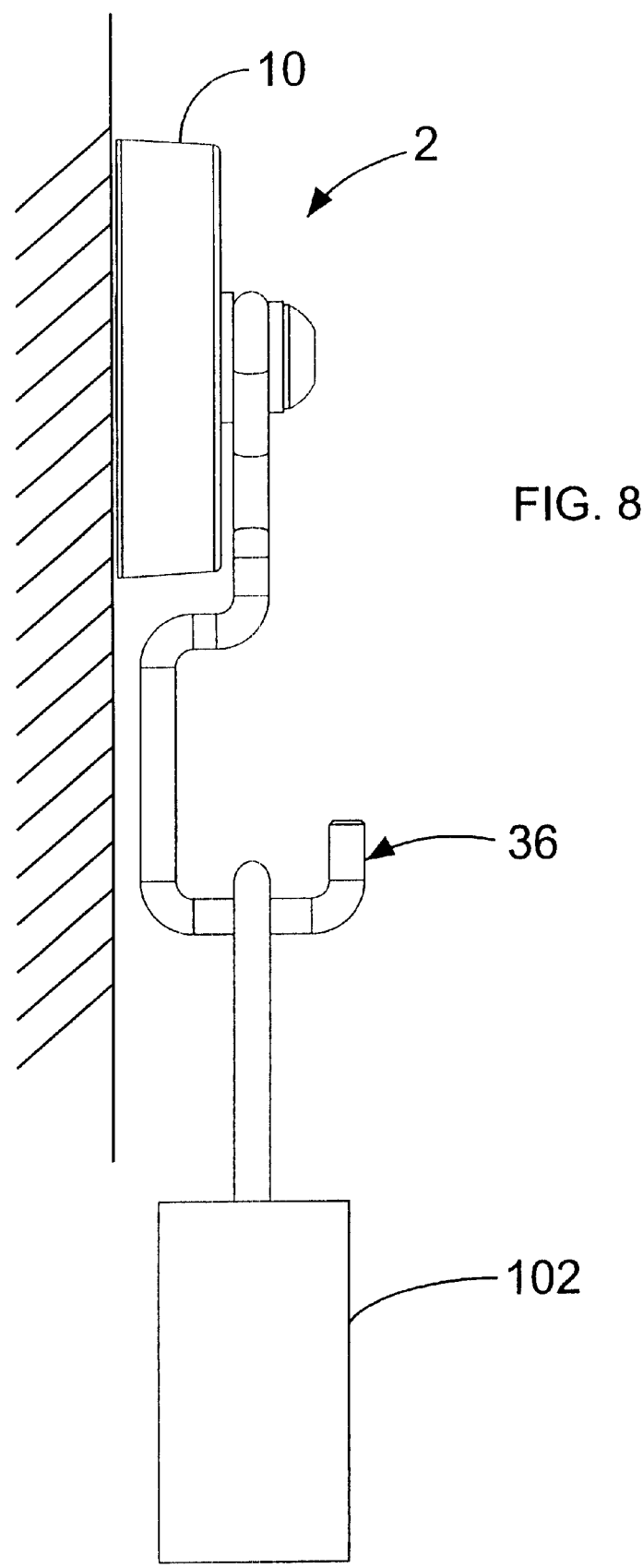
FIG. 8 is a side view perspective view of a magnetic hook with a hook in a open position in accordance with the present invention.
Figure 9:
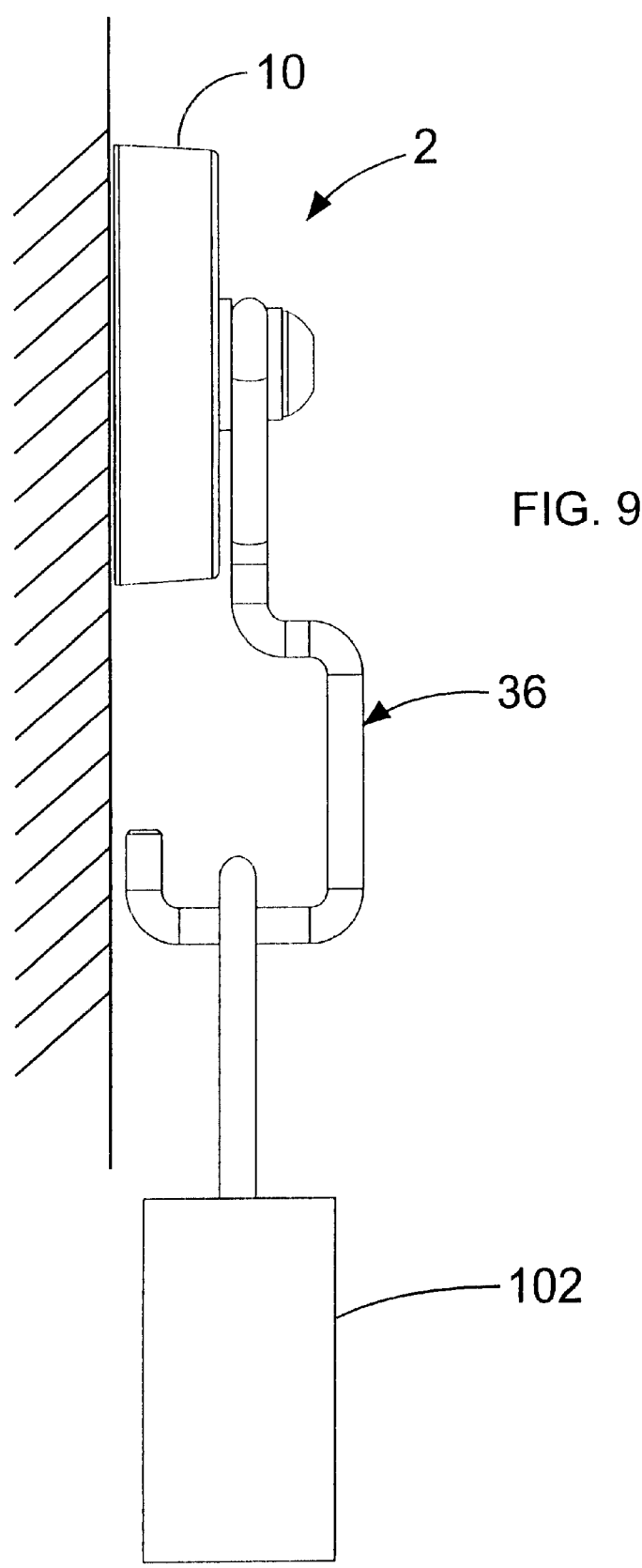
FIG. 9 is a side view perspective view of a magnetic hook with a hook in a closed position in accordance with present invention.

FIG. 5 shows an exploded perspective view of a magnetic hook 2. The magnetic hook 2 includes the magnet 10, hook 36, and a fastener 38. A turned-up end 40 is formed on one end of the hook 36 and an opening 42 is formed on the other end thereof. A tapped hole 48 is preferably formed in a top of the magnet 10 to threadably receive the fastener 38. A flat washer 46 is preferably inserted between the hook 36 and the magnet 10. A lock washer 44 is preferably inserted between the hook 36 and the fastener 38. The one end of the hook 36 is offset from the other end such that rotating the hook 36, 180 degrees, provides two different positions. FIGS. 6 & 8 show the hook 36 in a first position. In the first position, an item 102 may be easily placed or removed from the hook 36. FIGS. 7 & 9 show the hook 36 in a second position. In a second position, the magnet 10 must be detached from a mounting surface to place or remove an item 102 from the hook 36.

The magnetic mounting object holder could be mounted to a surface without the magnet 10. A fastener would be inserted through a hole in the fastening plate 18 and tapped into a mounting surface. The magnetic mounting object holder without the magnet 10 would become a mounting object holder.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A magnetic mounting object holder comprising:

a magnet;

a mounting base, said magnet being attached to a bottom of said mounting base at one end, an opening being formed through the other end thereof;

a pivotal mounting plate including a mounting frame and a mounting plate, said mounting plate being attached to a top of said mounting frame at one end, an opening being formed through the other end thereof; and a fastener being inserted through said opening in said mounting base and said opening in said pivotal mounting plate, a nut being threaded on to said fastener, tightening of said nut on said fastener retains said pivotal mounting plate stationary relative to said mounting base.

2. The magnetic mounting object holder of claim 1 wherein:

said mounting base includes a base frame and a fastening plate, said fastening plate being attached to a bottom of said base frame at said one end, said magnet being attachable to said fastening plate.

3. The magnetic mounting object holder of claim 1 further comprising:

means for attaching an object to said mounting plate.

4. The magnetic mounting object holder of claim 3, wherein:

said means for attaching an object to said mounting plate a hook and loop fastener.

5. A magnetic mounting object holder comprising:

a magnet;

a mounting base having a base frame and a fastening plate, said fastening plate being attached to a bottom of said base frame at one end, an opening being formed through the other end thereof, said magnet being attachable to said mounting base;

a pivotal mounting plate including a mounting frame and a mounting plate, said mounting plate being attached to a top of said mounting frame at one end, an opening being formed through the other end thereof; and a fastener being inserted through said opening in said mounting base and said opening in said pivotal mounting plate, a nut being threaded on to said fastener, tightening of said nut on said fastener retains said pivotal mounting plate stationary relative to said mounting base.

6. The magnetic mounting object holder of claim 5 further comprising:

means for attaching an object to said mounting plate.

7. The magnetic mounting object holder of claim 6, wherein:

said means for attaching an object to said mounting plate is a hook and loop fastener.

\* \* \* \* \*